Dec. 17, 1968 A. R. BLOCKER 3,416,256
CATAPULTING CASTING ROD
Filed June 17, 1966
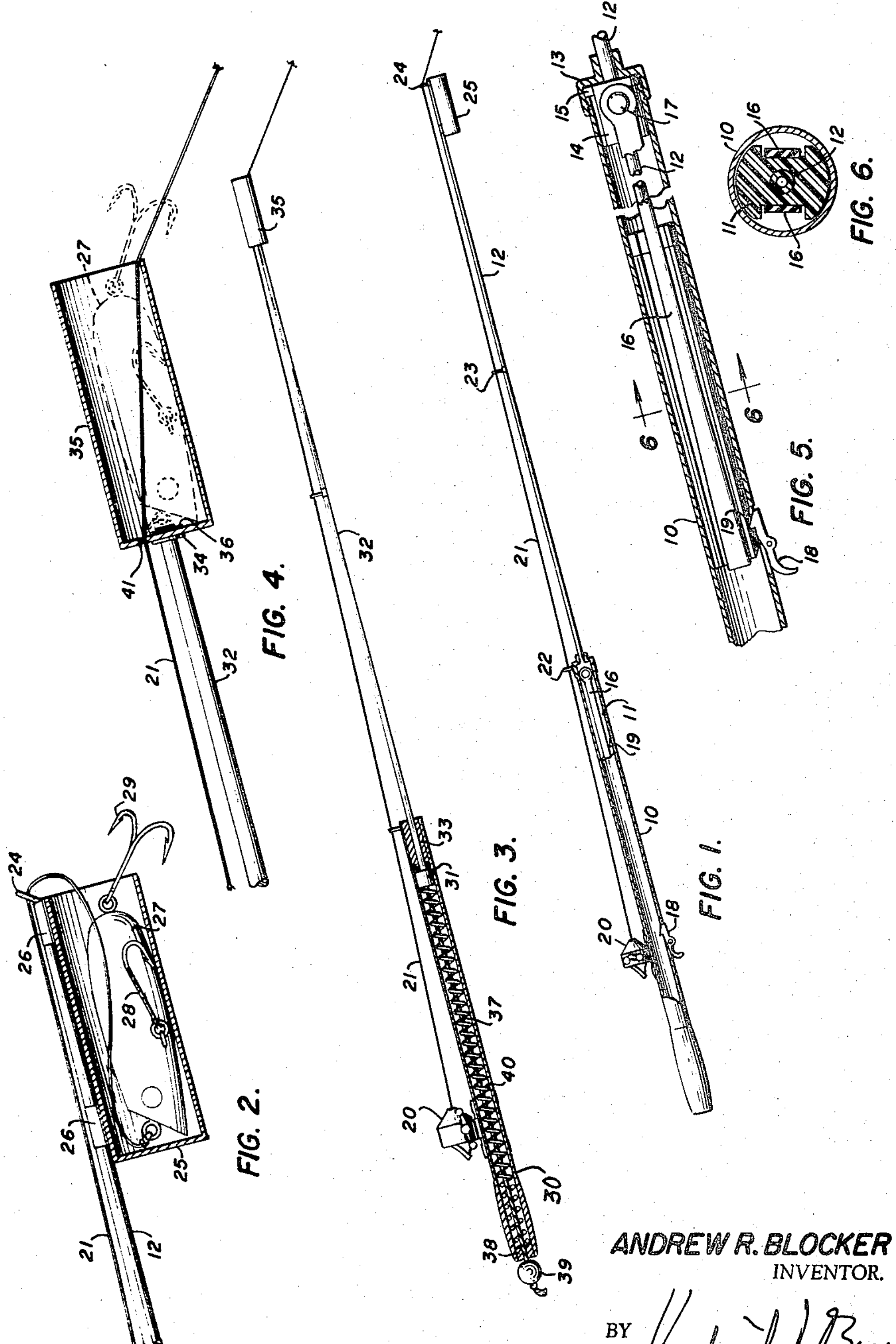
ANDREW R. BLOCKER
INVENTOR.
BY Herbert J. Brown
ATTORNEY United States Patent Office 3,416,256

Patented Dec. 17, 1968

3,416,256
CATAPULTING CASTING ROD

Andrew R. Blocker, Fort Worth, Tex., assignor to L. C. Line, Fort Worth, Tex.

Filed June 17, 1966, Ser. No. 558,375
2 Claims. (Cl. 43—19)

ABSTRACT OF THE DISCLOSURE

A catapulting casting rod having an imperforate tubular handle section with a bore of uniform diameter, a slide within the handle section having a diameter corresponding to the bore and having air bypass means thereon, a rod on the slide and extending outwardly of an end of the handle section, a lure or bait receiving cup on the extending end of the rod and spring means in the handle section for quickly moving the rod and cup outwardly. The cup and rod are actuated by a knob connected with the inner end of the slide whereby the spring means may be manually compressed any desired amount and manually released to catapult the lure or bait a desired distance. The handle section has closure means at each end which serve as guides for the rod and knob connection, respectively. The cup is of a size and shape to substantially fully receive the lure or bait so as to protect others from fish hooks thereon.

This invention relates to casting rods for fishing and has reference to improvements in that type of casting rod which catapults a lure or bait to a desired area on the water. With such rods one can fish in crowded conditions without the hazard of injuring someone else, and one can fish from beneath low trees without catching his lure or bait on a limb.

Generally, such rods consist of a tubular handle section, an extensible rod slidably received therein, spring means extending the rod, stop means therefor, means contacting and engaging a lure or weighted bait on the extending end of the rod, a reel on the tubular handle section, a line on the reel connected with the bait or lure, and trigger means releasing the spring means. While prior devices served their intended purposes, they were objectionable in that all hooks on the lures were fully exposed at all times.

An object of the invention is to provide a catapult type casting rod having an ejection cup on the end of its extensible rod, which cup receives all or substantially all of the lure or baited hook to be cast, thereby reducing the probability of accidently hooking someone or objects when handling the casting rod other than when fishing.

Another object, in a preferred form of the invention, is to provide means selecting the amount of thrust for each catapulting action for controlling the trajectory of the lure or bait.

A further object is to provide, in a casting rod of the described class, means initially directing the flight of a lure along its length, thus reducing tumbling and thereby reducing air resistance.

These and other objects of the invention will become apparent from the following description and the accompanying drawing, in which:

FIGURE 1 is a side elevational and broken sectional view of a catapulting fishing rod according to the invention.

FIGURE 2 is an enlarged broken side elevation of the extending end of the rod and showing the ejection cup in longitudinal section mounted thereon.

FIGURE 3 is a view similar to FIGURE 1 and illustrating another form of the invention.

FIGURE 4 is an enlarged view similar to FIGURE 2 and illustrating the mounting of the ejection cup first illustrated in FIGURE 3.

FIGURE 5 is an enlarged broken longitudinal sectional view of the extending end of the tubular hand section of FIGURE 1, and FIGURE 6 is a sectional view taken on line 6—6 of FIGURE 5.

The form of the invention shown in FIGURES 1, 2, 5 and 6 includes a tubular handle section 10, a slide 11 therein, and a rod 12 mounted in one end of the slide and slidably extending through a cap 13 threadedly mounted on the end of the tubular handle section. A guide 14 having a substantially circular flange 15 around one end is received in the end of the handle section 10 and is held in place by the cap 13. There is an axial opening, not shown, through the guide 14 through which the rod 12 slides.

As best shown in FIGURE 6, the sides of the slide 11 are longitudinally grooved to receive a length of elastic 16 or other spring means. As shown in FIGURE 5 and indicated in FIGURE 6, the opposite sides of the guide 14 are flat and have projecting buttons 17 on which the ends of the elastic 16 are attached. The center portion of the elastic 16 is looped around the inner end of the slide 11. Mounted beneath the handle section 10 near the end opposite the cap 13 and extending into the handle section, there is a trigger 18 which engages a notch 19 in the bottom of the slide 11.

On top of the handle section 10 near the hand grip end, there is a spinner reel 20 which is detachably mounted in the usual manner. The line 21 from the reel 20 extends through an eye 22 on the end of the handle section 10, an eye 23 on the rod 12 intermediate its ends, and through an eye 24 on the extending end of the rod.

Beneath the extending end of the rod 12 there is a cylindrical cup 25 which is detachably attached to and parallel with the rod by spring clips 26. The open end of the cup 25 receives an artificial lure 27 which is connected to the end of the line 21. In FIGURE 2, the forward hooks 28 of the lure 27 are fully received in the cup 25, whereas the rear hooks 29 project therefrom. However, within the scope of the invention the cup 25 may be large enough to receive both forward and rear hooks 28 and 29.

In operation, the rod 12 is pressed into the handle section 10 against the spring action of the elastic 16 and the trigger 18 is caused to engage the notch 19 in the slide 11. The lure 27 is placed in the cup 25 either before or after the first operation and any slack in the line is reeled in after the lure is in place. The handle section is then held at an angle to aim the trajectory of the lure 27, and the trigger 18 is pulled, releasing the slide 11 which causes the rod 12 to extend quickly. The last movement continues until the slide 11 is stopped by the guide 14, at which time the lure 27 is catapulted from the cup 25. After landing in the water the lure 27 is reeled in the usual manner. When desired, the cup 25 may be removed from the rod 12 and the assembly, with the rod 12 extended, may be used as a casting rod in the usual manner.

The form of the invention illustrated in FIGURES 3 and 4 includes an imperforate tubular handle section 30 including a uniform bore, a cylindrical slide 31 therein having a diameter corresponding to that of the bore and a rod 32 on the slide and extending through a cylindrical guide or closure 33 in the end of the handle section. The slide 31 has air bypass means, not shown, such as flat sides as shown in FIGURE 6 and described in the first form of the invention. Axially mounted on extending end of the rod 32, which is shouldered at its end and has a washer 34 thereon, there is a cylindrical cup 35 which is held in place by a nut 36. A flexible cord 37 is connected with the inner end of the slide 31 and extends outwardly through a guide or closure 38 in the rear of the handle section where it is provided with a knob 39. A small diameter shaft, not shown, may be used instead of the cord 37. A coiled compression spring 40 around the cord 37 bears against the slide 31 at one end and the rear guide 38 at its other end.

The same reel 20, line 21, eyes 22 and 23 and lure 27 as described in connection with the first form of the invention are used, but instead of the eye 24 on the end of the rod 12 the line is threaded through a hole 41 in the base of the cup 35.

As before, the lure 27 is placed in the cup 35 and any slack in the line 21 is reeled in. The handle section 30 is held in one hand and aimed in the desired direction. The knob 39 is pulled a distance to compress the spring 40 a desired amount and is then quickly released. The rod 32 shoots outwardly until the slide 31 is stopped by the guide 33. The lure 27 is thus catapulted from the cup 35 and after landing in the water it is reeled in.

What is claimed is:

1. A casting rod comprised of an imperforate tubular handle section having a hand grip end and an extending end, said section having a bore of uniform diameter, a slide slidably mounted in said tubular handle section and having a diameter corresponding to that of said bore, air bypass means on said slide permitting air in said bore to move in either direction past said slide and permitting free movement of said slide, a rod mounted in one end of said slide and extending outwardly of the extending end of said tubular handle section, spring means urging said slide toward the extending end of said tubular handle section, means compressing and releasing said spring means, stop means limiting the outward movement of said slide, a cup mounted on the extending end of said rod, the rim of said cup being outwardly directed with reference to the length of said rod, said means compressing and releasing said spring means being comprised of a knob outwardly of said hand grip end of said tubular handle section and means connecting said knob with said slide, said stop means forming a closure for the extending end of said handle section and guiding said rod, and a closure at the hand grip end of said handle section and guiding said connecting means.

2. A casting rod as defined in claim 1 and wherein said cup is of a size and shape to receive substantially all of a lure or baited hook to be cast.

References Cited

UNITED STATES PATENTS

| | | | |
|---|---|---|---|
| 2,522,060 | 9/1950 | Ridland | 43—22 X |
| 2,584,678 | 2/1952 | Dewey | 43—19 |
| 2,671,289 | 3/1954 | McCullough | 43—19 |
| 2,932,111 | 4/1960 | Kremski et al. | 43—19 |
| 3,026,644 | 3/1962 | Raider | 43—19 |
| 3,279,115 | 10/1966 | Worsham | 43—19 |
| 1,473,507 | 11/1923 | Obermaier | 43—19 |

SAMUEL KOREN, *Primary Examiner.*

J. H. CZERWONKY, *Assistant Examiner.*

U.S. Cl. X.R.

43—25.2